United States Patent [19]

Rasmussen et al.

[11] Patent Number: 5,202,846
[45] Date of Patent: Apr. 13, 1993

[54] PRIME NUMBER SPUR REDUCTION FOR DIGITAL SYNTHESIS

[75] Inventors: Kurt E. Rasmussen, Torrance; Tom C. Bryan, Redondo Beach, both of Calif.

[73] Assignee: Hughes Aircraft Company, Los Angeles, Calif.

[21] Appl. No.: 632,248

[22] Filed: Dec. 19, 1990

[51] Int. Cl.$^5$ ............................................. G06F 1/02
[52] U.S. Cl. ............................. 364/721; 328/14
[58] Field of Search ............... 364/721, 718; 328/14

[56] References Cited

U.S. PATENT DOCUMENTS

| | | | |
|---|---|---|---|
| 4,039,806 | 8/1977 | Fredriksson et al. | 364/721 |
| 4,192,007 | 3/1980 | Becker | 364/721 |
| 4,346,448 | 8/1982 | Insam et al. | 364/721 X |
| 4,476,536 | 10/1984 | Jones, Jr. | 364/721 |
| 4,901,265 | 2/1990 | Kerr et al. | 364/721 |
| 5,070,254 | 12/1991 | Summers | 328/14 X |

*Primary Examiner*—Tan V. Mai
*Attorney, Agent, or Firm*—L. A. Alkov; W. K. Denson-Low

[57] ABSTRACT

A variable frequency synthesizer including a modulo N counter having a count limit N that is a product of prime numbers and responsive to a digital control word for providing a digital ramp signal representative of the phase of a sinewave, an inversion circuit responsive to the digital ramp signal for producing a digital triangular signal having a frequency determined by the control word, and conversion means for converting the digital triangular signal to an analog triangular signal. Selecting the count limit N as a product of prime numbers substantially reduces spurious distortion due to time step quantization of the digital ramp signal.

2 Claims, 3 Drawing Sheets

PRIME NUMBER SPUR REDUCTION FOR DIGITAL SYNTHESIS

BACKGROUND OF THE INVENTION

The subject invention is directed generally to frequency synthesizers, and more particularly to an improved variable frequency synthesizer that utilizes a modulo N counter, where N is a product of prime numbers, for achieving reduced spurious outputs and fast switching speeds.

Variable frequency synthesizers are utilized in applications such as radar and communications, and generally provide an output signal whose frequency is controlled by a digital input. A known variable frequency synthesizer includes a modulo 2i counter and an inversion network to generate a digital triangular staircase signal. A digital-to-analog converter converts the triangular signal to an analog signal which is then low pass filtered. The low pass filter output is hard limited to produce a square wave whose average frequency is the desired output frequency. The square wave is provided as a reference frequency to a phase locked loop which upconverts the reference frequency to a higher frequency, for example.

A consideration with the foregoing variable frequency synthesizer is the production of spurious signals near the desired output frequency. These spurious signals are generated in the digital portion of the frequency synthesizer and are inherent in present state of the art designs. This problem is particularly acute when the frequency step size is very small relative to the tuning bandwidth and the time to switch from one frequency to another is very short. The spurious signals place limitations on the performance of the radar or communications system, for example, that includes the frequency synthesizer.

SUMMARY OF THE INVENTION

It would therefore be an advantage to provide a variable frequency synthesizer that provides for reduced spurious signals in the reference frequency output.

The foregoing and other advantages are provided by the invention in a variable frequency synthesizer that includes a modulo N counter having a count limit N that is a product of prime numbers and responsive to a digital control word for providing a digital ramp signal representative of the phase of a sinewave, an inversion circuit responsive to the digital ramp signal for producing a digital triangular signal having a frequency determined by the control word, and conversion means for converting the digital triangular signal to an analog triangular signal. By selecting the count limit N as a product of prime numbers substantially reduces spurious distortion due to time step quantization of the digital ramp signal.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
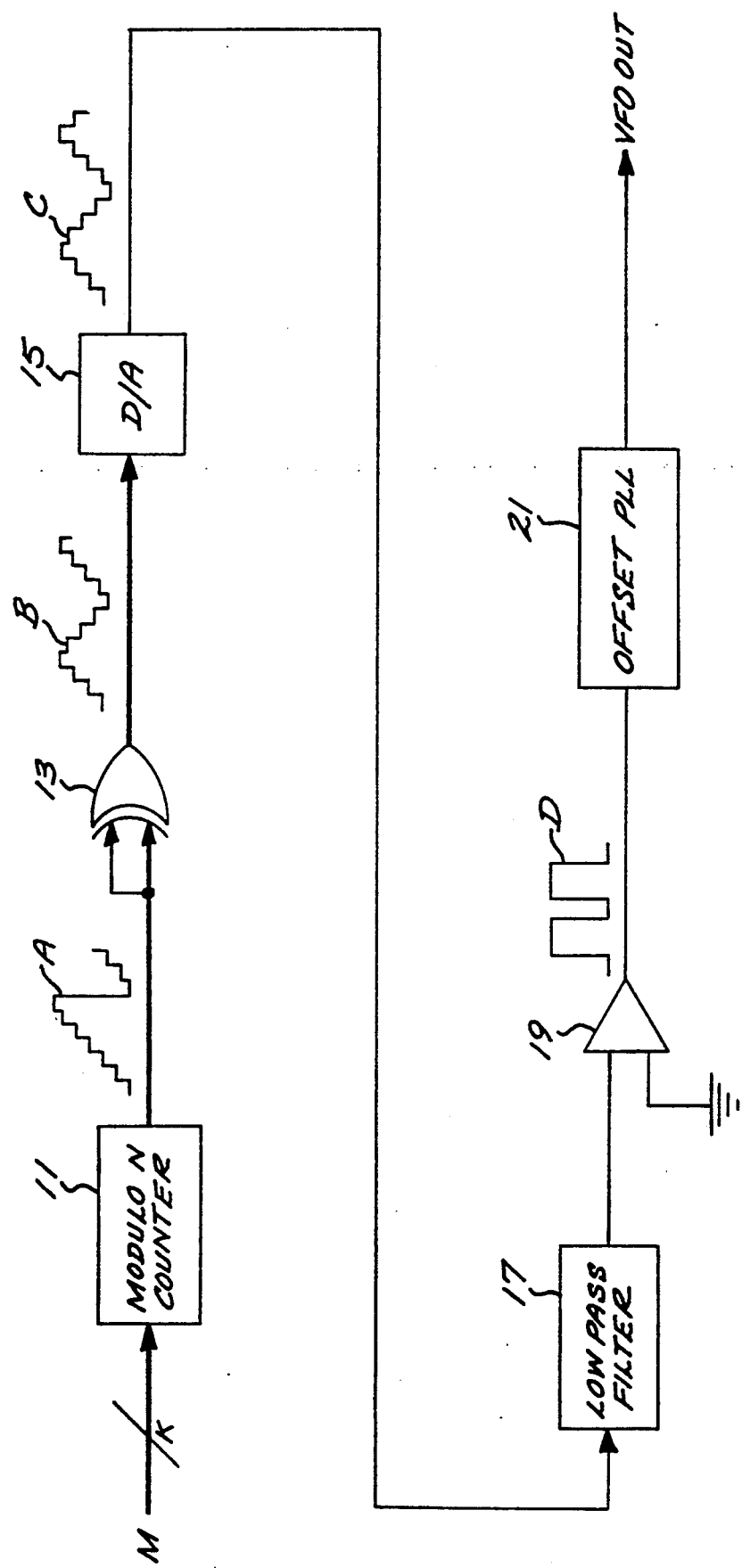
FIG. 1 is a block diagram of a variable frequency synthesizer in accordance with the invention.

In the following detailed description and in the several figures of the drawing, like elements are identified with like reference numerals.

Referring now to FIG. 1, set forth therein is a block diagram of a variable frequency synthesizer 10 that includes a modulo N counter 11 having a count limit that is a product of prime numbers. A k-bit control word M is provided to the modulo N counter 11 to control the count increment. In particular, the output of the modulo N counter 11 increments by the value of the control word M upon each clock, and when the count equals or exceeds the count limit N at a given clock, the counter resets with the residue as the starting value for the next clock.

The modulo N counter and the remaining digital components are clocked by a periodic clock signal having a frequency $F_{CLK}$. The output of the modulo N counter 11 is a digital ramp waveform comprising a sequence of numbers that increase with each clock cycle until the count equals or exceeds N, at which time the output is reset to the residue. The output begins to count up again with the next occurrence of the clock.

The time varying output of the modulo N counter 11 is depicted in FIG. 1 by the waveform A wherein amplitude represents digital value. This time varying output represents the phase (not amplitude) of a sinewave which increases linearly from 0 to $2\pi$ and then repeats.

The output of the modulo N counter 11 is provided to an inversion circuit 13 which produces a digital triangular waveform comprising a sequence of numbers that increases and then decreases about an average value, the midpoint. The inversion circuit 13 converts the time varying phase information of the modulo N counter output to a triangular waveform that contains amplitude information approximating a sinewave and is used as a surrogate for a sine function. The time varying output of the inversion circuit 13 is schematically depicted in FIG. 1 by the waveform B wherein amplitude represents digital value.

The inversion circuit 13 depicted in FIG. 1 is comprised of exclusive-OR gates (XOR) wherein the most-significant bit (MSB) of the digital word from the modulo-N counter 11 is used to control a one's complement function of the other bits. This has the effect of causing the incrementing function from counter 11 to only increment to $2^{n-1}$, where n is the number of bits in the counter output, and then decrement back down to 0. The inversion circuit is a very high speed implementation achieving a sinewave like function, and can be replaced by a read-only-memory (ROM) circuit or other circuit which generates exact sinewave function without effecting the performance of the synthesis scheme presented herein.

Figure 4:
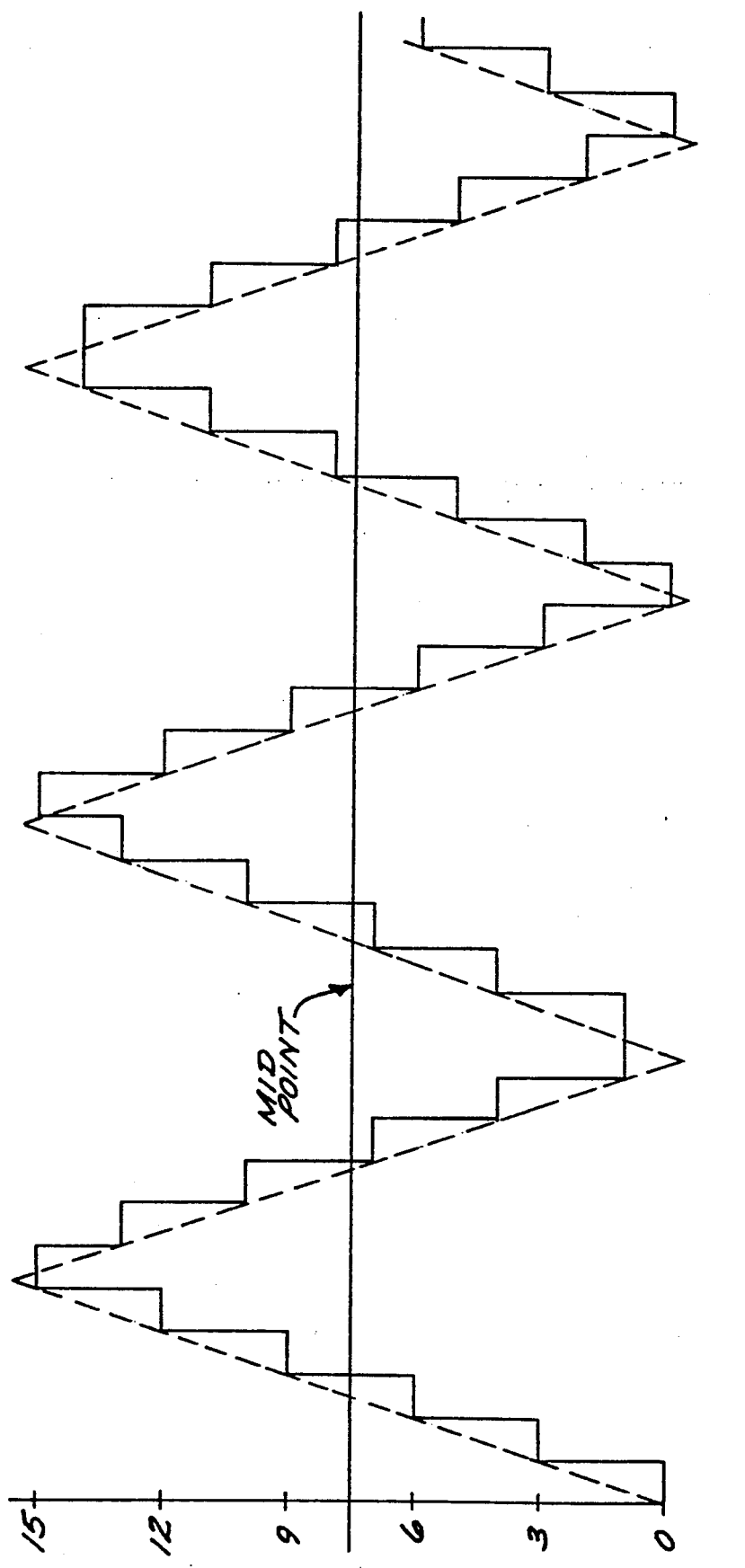
FIG. 4 schematically depicts the time varying output of the inversion circuit of the variable frequency synthesizer of FIG. 1

As an example of the inversion circuit, consider a 5-bit counter with the control word M set to the value 3 (input to register 11). Table I below lists the sequence of the output states of the modulo N counter and the output states of the inversion circuit for 32 clock cycles. After 32 clock cycles the sequence repeats. These 32 clock cycles generate 3 different triangular waveforms as shown in FIG. 4 which also shows in dashed lines the ideal triangular waveforms that the counter output is intended to represent. The deviations of the counter output from the ideal triangular waveform represent spurious phase information, and, as discussed further herein, such deviations are significantly reduced by the invention by selecting the count limit N of the modulo-N counter 11 to be a product of prime numbers.

TABLE I

| INPUT | | OUTPUT | |
|---|---|---|---|
| Binary | Decimal | Binary | Decimal |
| 00000 | 0 | 00000 | 0 |
| 00011 | 3 | 00011 | 3 |
| 00110 | 6 | 00110 | 6 |
| 01001 | 9 | 01001 | 9 |
| 01100 | 12 | 01100 | 12 |
| 01111 | 15 | 01111 | 15 |
| 10010 | 18 | 01101 | 13 |
| 10101 | 21 | 01010 | 10 |
| 11000 | 24 | 00111 | 7 |
| 11011 | 27 | 00100 | 4 |
| 11110 | 30 | 00001 | 1 |
| 00001 | 1 | 00001 | 1 |
| 00100 | 4 | 00100 | 4 |
| 00111 | 7 | 00111 | 7 |
| 01010 | 10 | 01010 | 10 |
| 01101 | 13 | 01101 | 13 |
| 10000 | 16 | 01111 | 15 |
| 10011 | 19 | 01100 | 12 |
| 10110 | 22 | 01001 | 9 |
| 11001 | 25 | 00110 | 6 |
| 11100 | 28 | 00011 | 3 |
| 11111 | 31 | 00000 | 0 |
| 00010 | 2 | 00010 | 2 |
| 00101 | 5 | 00101 | 5 |
| 01000 | 8 | 01000 | 8 |
| 01011 | 11 | 01011 | 11 |
| 01110 | 14 | 01110 | 14 |
| 10001 | 17 | 01110 | 14 |
| 10100 | 20 | 01011 | 11 |
| 10111 | 23 | 01000 | 8 |
| 11010 | 26 | 00101 | 5 |
| 11101 | 20 | 00010 | 2 |
| 00000 | 0 | 00000 | 0 |

The digital output of the inversion circuit 13 is converted into a analog signal via a zero-order digital-to-analog converter (DAC) 15 and a low pass filter 17. The low pass filter removes high frequency noise and tends to smooth the output from the DAC 15. However, the low frequency phase modulation caused by the deviation of the digital triangular waveform from the ideal is relatively unaffected by this low pass filter since it is present as sidebands close to the desired output frequency from the DAC 15.

The limiter 19 removes the amplitude information and leaves only the phase information in the form of a square wave output, schematically depicted in FIG. 1 as the waveform D. Since the phase has spurious modulations due to the values chosen for M and N, the square wave reference signal provided to the offset phase lock loop (PLL) 21 still has spurious signals, but such spurious signals are reduced by the selection of the modulo N counter count limit N to be a product of prime numbers. The limiter output is used as a reference for generating a higher output frequency (VFO) which tracks the phase and frequency of the input reference signal offset and scaled by fixed values.

The fundamental output frequency of the limiter, as well as the fundamental frequency of the digital triangular waveform output of the inversion circuit, is controlled by the control word M, the modulo count limit N, and the clocking frequency, $F_{CLK}$. In particular, the average output frequency, $F_{OUT}$, of the midpoint or reference crossings is:

$$F_{OUT} = M \cdot F_{CLK}/N \qquad \text{(Equation 1)}$$

Due to finite time step intervals determined by $F_{CLK}$ and that the remainder in the modulo N counter usually changes with each output cycle, the midpoint crossing times of the digital triangular waveform are usually slightly off from the ideal midpoint crossing times and only average about the ideal midpoint crossings in a pseudo-random but periodic fashion. This undulation around the ideal midpoint crossing times causes spurious phase modulation of the output signal. However, as a result of selecting the count limit N to be a product of prime numbers, the midpoint crossing times are made closer to the ideal, as discussed further herein.

Figure 2:
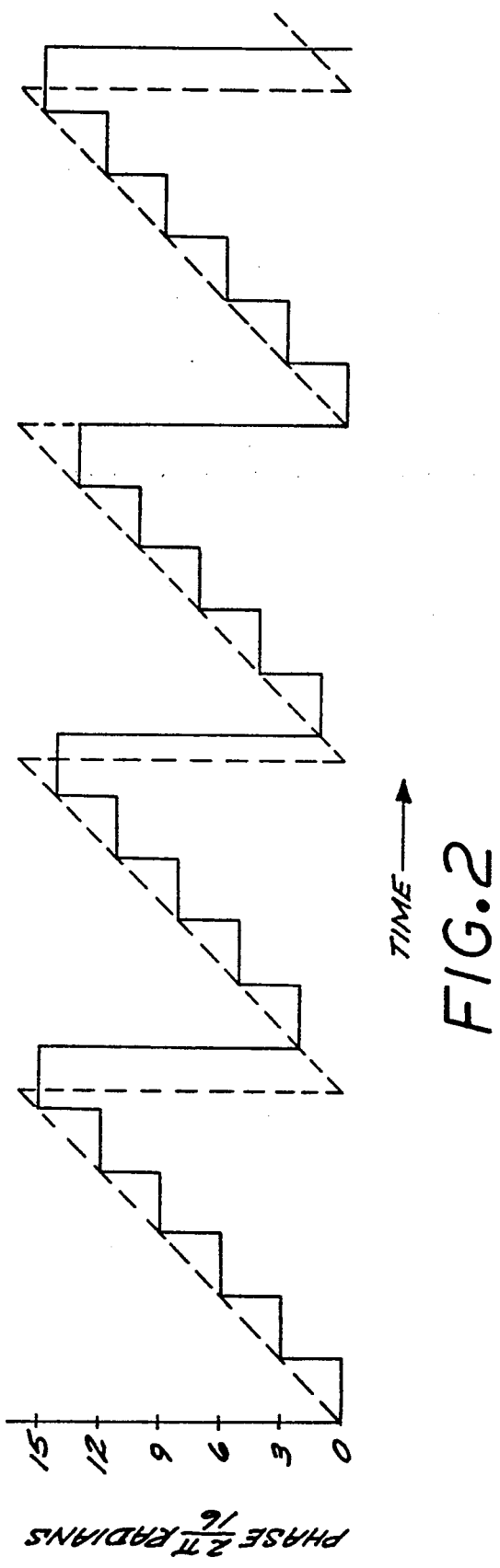
FIGS. 2 and 3 schematically depict the time varying output of the modulo N counter of the variable frequency synthesizer of FIG. 1 for different values of input control words.

Further in regard to reducing the undulation of the midpoint crossings of the digital triangular waveform relative to the ideal midpoint crossings, consider now the quantization errors introduced as a result of utilizing digital signals to represent continuously varying signals. For the example of the counter having 16 states ($2^4$) and the control word M having the value 3, the output of the counter will be 0, 3, 6, 9, 12, 15, 2, 5, 8, 11, 14, 1, 4, 7, 10, 13, 0, ... as illustrated in FIG. 2. The counter needs to cycle 3 times before repeating the exact sequence. The first cycle contains 6 states of the digital accumulator followed by two cycles of 5 states. For the first cycle the frequency is $F_{CLK}/6$. For the second and third cycle the frequency is $F_{CLK}/5$. The resulting average frequency is $F_{CLK}/5\frac{1}{3}$ (the result of 3 cycles × $F_{CLK}/16$ states). The desired output frequency has a period that is $5\frac{1}{3}$ digital clock periods in length, and thus 3 periods of the output frequency are required to arrive at the exact same state of the modulo N counter. The increase at each clock cycle represents an increase in phase of the desired signal.

The resulting fractional clock period in the example above causes phase modulation on the desired signal. The period of this phase modulation is 3 times the period of the desired signal. The resulting output will therefore have spurious sideband signals near the desired signal at $\frac{1}{3}$ the output frequency. If the control word M had been set to 1, 2, or 4, then the period of the desired signal would be an exact multiple of the digital clock frequency, as illustrated in FIG. 3, and no spurious sideband signal would be generated.

Figure 3:
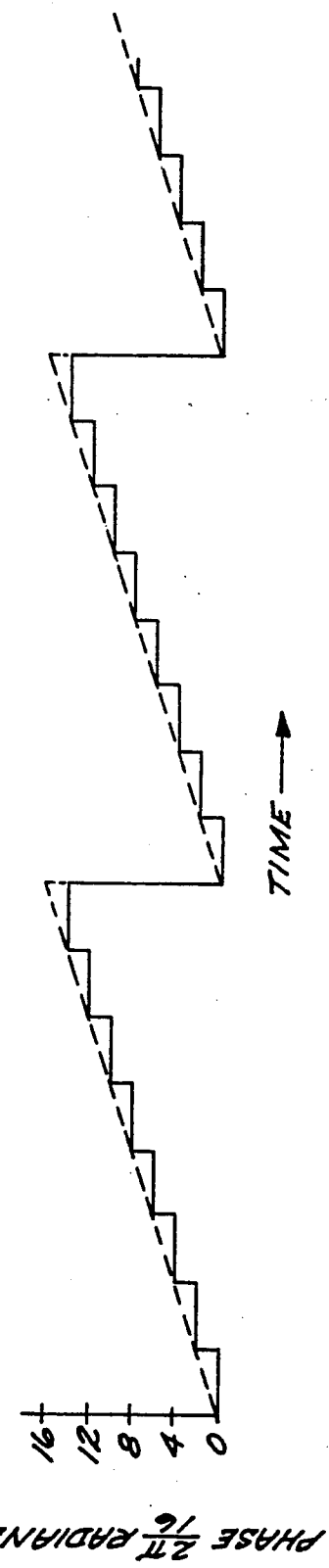

FIG. 2 also includes in dashed lines the ideal time varying phase waveform represented by the counter output for a control word of 3, and FIG. 3 includes in dashed lines the ideal time varying phase waveform represented by the counter output for a control word 1, 2, or 4. When the control word is equal to 3, the completion of a full $2\pi$ radians for the ideal sinewave does not correspond to a time when the modulo N counter changes state except for every third cycle, as noted above. However, when the control word is set to 1, 2, or 4, the completion of a full $2\pi$ radians of the ideal sinewave does correspond to the time when the digital accumulator changes state, as also noted above.

If the counter output contains erroneous phase information, the inversion circuit also contains erroneous phase information including erroneous midpoint crossing times, as shown in FIG. 4 which also depicts the ideal triangular waveform that the inversion circuit is intended to represent and is based on the above example of a control word of 3 and a counter having 16 states.

As indicated above, for certain control word values the completion of a full $2\pi$ radians of the ideal sinewave corresponds to the time when the counter output changes state, which brings the times of the midpoint crossings of the digital triangular waveform closer to the ideal. In accordance with the invention, selecting the count limit N to be a product of prime numbers allows a larger number of control words to provide this result, which can be better appreciated by analyzing the functions of the PLL.

The ability of the PLL to track the reference signal is governed by the bandwidth of the PLL. As the bandwidth of the PLL increase, the faster the PLL can switch frequency and track changes in phase shifts of the reference. The PLL in essence acts as a narrow tracking filter around the reference. The difficulty in designing a synthesizer is to make the PLL bandwidth wide enough to switch rapidly yet narrow enough to filter out spurious signals from the reference signal. This is especially difficult when low frequency resolution step size is required of the reference.

In order to achieve low frequency resolution, the value of N needs to be very large. However, as N is made larger, the potential for low frequency phase modulated sidebands is greatly increased. Referring to Equation 1 and the example of the modulo N counter, $F_{OUT}$ is an average fundamental frequency which is composed of P slightly different cycles of the triangular waveform. It can be shown that P is the product of factors which are not common between the control word M and the count limit N. In the example above, 3 was the factor not common with N.

If N is chosen to only be a power of 2 then control words that contain odd numbers as factors for the control word M will exhibit spurious phase modulation sidebands. This can cause a frequency spectrum to show P frequency sidebands around the desired reference frequency. As the product of uncommon factors, P, gets larger, the more likely the phase modulated sidebands will be within the PLL bandwidth. In general, the spurious signals will map into the PLL bandwidth if the following condition is met:

$$K * F_o - L * F_s \leq |F_o \pm B| \qquad \text{(Equation 2)}$$

where:
B = PLL Bandwidth
$F_s$ = DAC sampling clock frequency
$F_o$ = Reference output (triangular waveform)
K = Harmonic of output frequency
L = Harmonic of sampling frequency By substituting Equation 1 into Equation 2, the effect of selecting the control word M and letting the count limit N be equal to a power of 2 is readily apparent.

By selecting the count limit N of the modulo N counter to be a product of prime factors, such as 2, 3, 5, 7, ... 7, 19, ... very large values for N can be achieved without spurious signals falling within the PLL bandwidth. The objective is to maximize the number of common factors between the control word M and the count limit N. Even though all factors will generally not be included, most of the spurs will not map into the PLL bandwidth even for large values of B relative to the frequency step size. Those that do map into B will be very small since the value for K will normally be quite large and will consequently have the effect of reducing the spurious level by $-40 \log K$ (dB) below the desired reference frequency power level.

Although the foregoing has been a description and illustration of specific embodiments of the invention, various modifications and changes thereto can be made by persons skilled in the art without departing from the scope and spirit of the invention as defined by the following claims.

What is claimed is:

1. A variable frequency synthesizer comprising:

modulo N counting means responsive to a digital control word for providing a digital ramp signal representative of the phase of a sinewave, the count limit N being a product of prime numbers;

gating means responsive to said digital ramp signal for producing a digital periodic signal having a frequency determined by the control word; and conversion means for converting said digital periodic signal to an analog periodic signal;

whereby selecting the count limit N as a product of prime numbers substantially reduces spurious distortion due to time step quantization of said digital ramp signal.

2. A variable frequency synthesizer comprising:

modulo N counting means responsive to a digital control word for providing a digital ramp signal that increments by the value of the control word until the count equals a count limit N which is a product of prime numbers and then resets to the residue, said counting means being configured so that the resetting times of the digital ramp signal substantially correspond to the completion of cycles of a sinewave;

gating means responsive to said digital ramp signal for producing a digital periodic signal having a frequency determined by the control word; and conversion means for converting said digital periodic signal to an analog periodic signal;

whereby selecting the count limit N as a product of prime numbers and configuring said counting means output resetting times to substantially correspond to the completion of cycles of a sinewave reduces spurious distortion due to time step quantization of said digital ramp signal.

* * * * *